(12) United States Patent
Zeulner

(10) Patent No.: US 10,828,835 B2
(45) Date of Patent: Nov. 10, 2020

(54) UNPACKING DEVICE FOR UNPACKING AN ADDITIVELY MANUFACTURED THREE-DIMENSIONAL OBJECT FROM THE SURROUNDING CONSTRUCTION MATERIAL

(71) Applicant: CL SCHUTZRECHTSVERWALTUNGS GMBH, Lichtenfels (DE)

(72) Inventor: Fabian Zeulner, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 327 days.

(21) Appl. No.: 15/811,485

(22) Filed: Nov. 13, 2017

(65) Prior Publication Data

US 2018/0133968 A1    May 17, 2018

(30) Foreign Application Priority Data

Nov. 14, 2016    (DE) .................. 10 2016 121 775

(51) Int. Cl.
*B29C 64/379* (2017.01)
*B29C 64/35* (2017.01)
(Continued)

(52) U.S. Cl.
CPC .......... *B29C 64/379* (2017.08); *B22F 3/1055* (2013.01); *B22F 3/24* (2013.01);
(Continued)

(58) Field of Classification Search
CPC ..... B29C 64/379; B29C 64/393; B29C 64/35; B29C 64/357; B29C 64/141;
(Continued)

(56) References Cited

U.S. PATENT DOCUMENTS

2002/0090410 A1* 7/2002 Tochimoto ............ B29C 64/321
                                                           425/215
2010/0192806 A1* 8/2010 Heugel .................. B33Y 40/00
                                                           106/286.1
(Continued)

FOREIGN PATENT DOCUMENTS

CN    102164735 A    8/2011
DE    102007018601 A1    10/2008
(Continued)

OTHER PUBLICATIONS

European Search Opinion Corresponding to Application No. 17186476 dated Mar. 9, 2018.
(Continued)

*Primary Examiner* — Nahida Sultana
(74) *Attorney, Agent, or Firm* — Dority & Manning, P.A.

(57) ABSTRACT

An unpacking device (4) for unpacking an additively manufactured three-dimensional object (2) from the unsolidified construction material (3) surrounding it after completion of an additive construction process, comprising a suction and/or blower device (12) which comprises at least one suction and/or blower tool (10) with a suction and/or blower tool body (12), wherein the geometric structural design of the suction and/or blower tool body (13) can be or is adapted to at least a partial area of the geometric structural design of an additively manufactured three-dimensional object (2) to be unpacked.

20 Claims, 4 Drawing Sheets

(51) Int. Cl.
  *B29C 64/393* (2017.01)
  *B22F 3/24* (2006.01)
  *B22F 3/105* (2006.01)
  *B33Y 50/02* (2015.01)
  *B29C 64/153* (2017.01)
  *B33Y 40/00* (2020.01)
  *B29C 64/165* (2017.01)
  *B29C 64/141* (2017.01)
  *B29C 64/357* (2017.01)

(52) U.S. Cl.
  CPC ............ *B29C 64/35* (2017.08); *B29C 64/393* (2017.08); *B29C 64/141* (2017.08); *B29C 64/153* (2017.08); *B29C 64/165* (2017.08); *B29C 64/357* (2017.08); *B33Y 40/00* (2014.12); *B33Y 50/02* (2014.12)

(58) Field of Classification Search
  CPC ... B29C 64/165; B29C 64/153; B22F 3/1055; B22F 3/24; B22F 2003/1056; B33Y 40/00; B33Y 50/02; C04B 35/622
  See application file for complete search history.

(56) References Cited

U.S. PATENT DOCUMENTS

| | | | |
|---|---|---|---|
| 2015/0021815 A1* | 1/2015 | Albrecht | B23K 31/12 264/235 |
| 2016/0136731 A1 | 5/2016 | McMurtry et al. | |
| 2017/0252811 A1* | 9/2017 | Myerberg | B22F 3/008 |
| 2018/0065208 A1* | 3/2018 | Mori | B23Q 7/04 |
| 2018/0215079 A1* | 8/2018 | Hakkaku | B29C 33/442 |
| 2018/0264679 A1* | 9/2018 | van Rooyen | C04B 35/622 |
| 2018/0297284 A1* | 10/2018 | Fulop | B08B 3/12 |
| 2019/0193148 A1* | 6/2019 | Kiener | B33Y 40/00 |
| 2019/0283183 A1* | 9/2019 | Koch | B33Y 40/00 |
| 2019/0337245 A1* | 11/2019 | Bowden, Jr. | B29C 33/308 |
| 2019/0344299 A1* | 11/2019 | Tenhouten | B22F 3/1055 |
| 2020/0001536 A1* | 1/2020 | DeSimone | B33Y 40/00 |
| 2020/0016834 A1* | 1/2020 | Yuwaki | B33Y 30/00 |
| 2020/0122392 A1* | 4/2020 | Townsend | B29C 64/209 |

FOREIGN PATENT DOCUMENTS

| | | |
|---|---|---|
| DE | 102013223411 A1 | 5/2015 |
| JP | 2016527390 A | 9/2016 |
| WO | 2010083997 A2 | 7/2010 |
| WO | WO2015/141776 A1 | 9/2015 |

OTHER PUBLICATIONS

European Search Report Corresponding to Application No. 17186476 dated Mar. 9, 2018.
Machine Translated Japanese Office Actions Corresponding to Application No. 2017217190 dated Nov. 21, 2018.
German Search Results Corresponding to Application No. 102016121775 dated Dec. 10, 2018.
Machine Translated Chinese Office Action Corresponding to Application No. 201710818688 dated May 29, 2019.
Machine Translated Japanese Office Action Corresponding to Application No. 2017217190 dated Oct. 30, 2019.

* cited by examiner

UNPACKING DEVICE FOR UNPACKING AN ADDITIVELY MANUFACTURED THREE-DIMENSIONAL OBJECT FROM THE SURROUNDING CONSTRUCTION MATERIAL

CROSS-REFERENCE TO RELATED APPLICATIONS

This application claims priority to German Patent Application serial no. 10 2016 121 775.1 filed Nov. 14, 2016, the contents of which is incorporated herein by reference in its entirety as if set forth verbatim.

The invention relates to an unpacking device for unpacking an additively manufactured three-dimensional object from the unsolidified construction material surrounding it after completion of an additive construction process, comprising a suction and/or blower device, which comprises at least one suction and/or blower tool with a suction and/or blower tool body.

As is known, additively manufactured three-dimensional objects are surrounded by unsolidified powdery construction material after completion of the additive construction process. For unpacking the additively manufactured three-dimensional objects from the surrounding construction material, unpacking devices are known that comprise a suction and/or blower device with a suction and/or blower tool comprising a suction and/or blower tool body.

The geometric structural design of respective suction and/or blower tool bodies is typically fixed, which is in need of improvement with regard to the unpacking of additively manufactured three-dimensional objects of different geometric structural designs since certain geometries of the objects to be unpacked can sometimes be hard to achieve. Moreover, the fixed geometric structural design of the suction and/or blower tool body can pose a danger in unpacking processes of complexly, i.e., especially filigreely, designed objects since objects of a complex geometric structural design might get damaged by the suction and/or blower tool body.

Thus, the invention is based on the object to provide, in contrast to the above, an improved unpacking device for unpacking an additively manufactured three-dimensional object from the unsolidified construction material surrounding it after completion of an additive construction process.

The object is solved by an unpacking device according to claim 1. The dependent claims relate to possible embodiments of the unpacking device.

The unpacking device described herein serves the unpacking of an additively manufactured three-dimensional object ("object") from the unsolidified powdery construction material (construction material that can be solidified in the course of the successive, selective layer-by-layer exposure and thus successive, selective layer-by-layer solidification of construction material layers performed during the additive manufacturing of the object) surrounding it after completion of an additive construction process. The construction material is metal powder, for example; nevertheless, ceramic or plastic powder is conceivable as construction material as well. Unpacking is generally understood to mean removal of the construction material surrounding the respective object; the respective object is "freed" from the surrounding construction material.

The unpacking device comprises a suction and/or blower device. The suction and/or blower device is provided for generating a suction and/or blower flow for unpacking a respective object. The suction and/or blower device is therefore provided for unpacking a respective object by sucking off (suction flow) and/or blowing off (blower flow) construction material. In all cases, inert unpacking of respective objects can be realized; hence, the suction and/or blower flow used can be inert.

The suction and/or blower device comprises at least one suction and/or blower tool. The suction and/or blower tool comprises a suction and/or blower tool body. In the suction and/or blower tool body, at least one, especially nozzle-like or -shaped, suction and/or blower opening for a suction and/or blower flow is typically formed. Respective suction and/or blower openings of the suction and/or blower tool body are advantageously arranged or aligned such that they face the object to be unpacked. The suction and/or blower tool is connected to a part of the suction and/or blower device generating a suction or blower flow via a pipe element that can be flown through by a suction or blower flow. The suction and/or blower tool body can (additionally) have a brush fitting comprising several, especially textile, brush elements arranged or formed bristle-like.

The geometric structural design, i.e., especially the dimensions and/or shape or basic shape, of the suction and/or blower tool body can be or is individually adapted to at least a partial area of the geometric structural design of at least one object to be unpacked, if necessary to the entire geometric structural design of at least one object to be unpacked. The spatial physical outer shape of the suction and/or blower tool body therefore corresponds specifically to at least a partial area of the spatial physical outer shape of the object to be unpacked, if necessary to the entire spatial physical outer shape of the object to be unpacked. The geometric structural design of the suction and/or blower tool body can be selected on the basis of data describing the geometric structural design of at least one object to be unpacked, especially on the basis of construction data describing the geometric structural design of an object to be unpacked. A suction and/or blower tool body geometry is provided that can be or is at least sectionally adapted specifically to the geometry of an object to be unpacked.

If an object to be unpacked—like, e.g., a cylinder or hollow cylinder—has, for example, a round or roundish geometric structural design, the geometric structural design of the suction and/or blower tool body is round or roundish as well. In this case, a suction and/or blower tool body with a geometric structural design adapted to the round or roundish geometry of the object to be unpacked, i.e., a suction and/or blower tool body with a round or roundish geometric structural design corresponding to the round or roundish geometric structural design of the object to be unpacked, is therefore used. If an object to be unpacked—like, e.g., a polyhedron—has a geometric structural design with several plane surfaces, the geometric structural design of the suction and/or blower tool body is plane as well. In this case, a suction and/or blower tool body with a plane geometric structural design corresponding to the geometric structural design of the object to be unpacked having several plane surfaces is therefore used. These principles apply analogously to any other geometrically defined or geometrically undefined geometric structural design of an object to be unpacked and the geometric structural design of the suction and/or blower tool body at least sectionally adapted to that.

The suction and/or blower tool body or individual, several, or all suction and/or blower tool body sections can therefore, e.g., at least sectionally have a straight shape or straight basic shape running two- or three-dimensionally and/or at least sectionally have a curved shape or curved basic shape running two- or three-dimensionally. For example, reference is made to a cannula-like or -shaped geometric structural design of the suction and/or blower tool body or a suction and/or blower tool body section, possibly at least sectionally running in a curve, so that the suction and/or blower tool body or a respective suction and/or blower tool body section can, e.g., be lead through an opening available in an object to be unpacked into an interior of the object; the cross-section geometry of the suction and/or blower tool body (section) is adapted to the cross-section geometry of the opening. At this point it is to be mentioned again that the suction and/or blower tool body has, depending on the geometric structural design of the object(s) to be unpacked, an individually adapted geometrically defined or geometrically undefined (free) geometric structural design.

The unpacking device allows for leading the suction and/or blower tool body closer to an object to be unpacked and/or—in the case of several objects to be unpacked—closer between objects to be unpacked that are arranged adjacently. The suction and/or blower tool body can be led to the object or, possibly through openings available in the object, into possibly existing interiors of the object. The difficulty described at the beginning that certain geometries of an, especially complexly designed, object to be unpacked are hard to achieve with the suction and/or blower tool body due to a fixed geometric structural design of the suction and/or blower tool body is thus taken into account. Moreover, the potential of damages during unpacking processes of complexly, i.e., especially filigreely, designed objects is reduced since the geometric structural design of the suction and/or blower tool body follows the geometric structural design of the object. Overall, in contrast to the above, an improved unpacking device is provided.

The suction and/or blower tool body can comprise several suction and/or blower tool body segments, which can be or are attached to each other detachably by forming the suction and/or blower tool body. The suction and/or blower tool body can therefore be composed of individual suction and/or blower tool body segments according to the modular design principle. Depending on the geometric structural design of the suction and/or blower tool body segments forming the suction and/or blower tool body, in terms of the geometric structure of the suction and/or blower tool body any, i.e., individually adaptable or adapted, configuration is possible. Respective suction and/or blower tool body segments can therefore have an identical or a different geometric structural design. With an exemplary combination of suction and/or blower tool body segments running straightly and in a curve, e.g., an L or U shape of the suction and/or blower tool body can be realized. With another exemplary combination of suction and/or blower tool body segments running, possibly differently, in a curve, e.g., a ring or wave shape of the suction and/or blower tool body can be realized.

Respective suction and/or blower tool body segments are typically provided with suitable mounting interfaces, which ensure stable, nevertheless typically detachable attachment of these to each other. Respective mounting interfaces can allow, e.g., form-locked and/or force-locked fastening of respective suction and/or blower tool body segments to each other.

By way of example, reference is made to clip, clamp, latch, and screw fastenings.

Respective suction and/or blower tool body segments are typically provided with at least one flow channel section. When respective suction and/or blower tool body segments are attached to each other, the flow channel sections form a flow channel that at least sectionally penetrates the suction and/or blower tool body. The flow channel communicates with respective suction and/or blower openings of the suction and/or blower tool body on the one hand and with a pipe element that can be flown through by a suction or blower flow on the other hand, via which the suction and/or blower tool is connected with a part of the suction and/or blower device generating a suction or blower flow.

The suction and/or blower tool body or a respective suction or blower tool body segment can at least sectionally, possibly completely, be an additively manufactured component or an additively manufactured component group. Additive manufacturing of the suction and/or blower tool body (segment) allows for manufacturing it in almost any geometric structural design.

The unpacking device can comprise a storage device. Several suction and/or blower tool bodies of a given geometric structural design and/or several suction and/or blower tool body segments of a given geometric structural design can be or are arranged in the storage device. The storage device serves in the sense of a warehouse or magazine the provision of suction and/or blower tool bodies (segments) of a given geometric structural design so that in case of need respective suction and/or blower tool bodies (segments) can be accessed easily and quickly to provide a suction and/or blower tool body geometry adapted to the geometry of an object to be unpacked as described. The suction and/or blower tool bodies (segments) can be arrangeable or arranged according to geometric structural criteria, especially according to the geometric dimension and/or geometric basic shape, in the storage device. In all cases, the storage device can comprise several storage compartments, which are provided for storing suction and/or blower tool bodies (segments) of a certain geometric structural design, i.e., adapted correspondingly in their dimensions, so that the storage device has a structure that is all in all as compact as possible.

The unpacking device can comprise a robot, especially an industrial robot, having at least three robot axes, wherein the suction and/or blower tool body is arranged or formed on a robot axis. A respective robot typically has at least one robot arm, which comprises several robot elements flexibly connected with each other via joint elements, typically arranged in series connection. The robot axes are typically assigned to respective robot elements. The robot can be designed, e.g., as a jointed arm or articulated arm robot with several robot elements arranged in series connection, flexibly connected with each other via respective joint elements. One, several, or all joint elements of the robot can be formed as swivel joints. Basically, the robot can be any type of robot or industrial robot having at least three robot axes. The suction and/or blower tool body is, as mentioned, arranged or formed on a robot axis. The robot axis on which the at least one unpacking tool is arranged or formed is typically a robot axis which is assigned to a robot element forming a free end of the robot arm. Due to the fact that the unpacking device comprises at least one respective robot, fully automatable or fully automated unpacking of respective objects is possible. It is not necessary to manually handle the suction and/or blower tool body. Unpacking processes are improved with regard to automatability, efficiency, and security.

The robot can have more than three robot axes, especially five, six, or more robot axes. The more robot axes the robot has, the greater is its freedom of movement within the scope of unpacking of respective objects. It has been mentioned that the robot can be designed as a jointed arm or articulated arm robot. In an advantageous embodiment, the robot is designed as a five- or six-axle jointed arm or articulated arm robot. Regardless of their number and thus also the concrete design of the robot, respective robot axes can typically be controlled independently. Accordingly, the robot axes can also be moved independently. Every robot axis can typically be moved in at least one freedom degree of motion.

The suction and/or blower tool body can be arranged detachably on the robot axis so that it is arranged exchangeably as necessary on the robot axis. To realize a detachable attachment of the suction and/or blower tool body, suitable, especially mechanic, mounting interfaces can be arranged or formed on the robot and/or on the suction and/or blower tool body, which allow the detachable attachment of the suction and/or blower tool body to the robot axis. However, detachable attachment of the suction and/or blower tool body to the robot axis can also be realized by the robot axis comprising a gripping element, which is provided for gripping the suction and/or blower tool body.

The detachable arrangement or attachment of the suction and/or blower tool body on/to the robot axis allows that the suction and/or blower tool body is arranged or attached exchangeably as necessary on/to the robot axis. An exchange process of the suction and/or blower tool body can be performed automatedly as well. The robot can be set, e.g., in a tool change mode or program specifically designed for that, to perform a suction and/or blower tool body change. Here, the robot can, e.g., be movable to an exchange position in which the robot autonomously performs a suction and/or blower tool body change. In the exchange position, the robot, i.e., at least the robot axis to which the suction and/or blower tool body is to be or is attached detachably, can give suction and/or blower tool bodies to an already mentioned storage device assigned to the unpacking device or take such from a storage device assigned to the unpacking device.

The unpacking device can comprise a control device implemented by hardware and/or software, provided for controlling the operation of a respective robot. The control device is provided especially for generating control information controlling the movements of the robot axes during operation of the robot. The control device can be provided for controlling the robot, especially by taking into account the geometric structural design of an object to be unpacked, so that it selects a suction and/or blower tool body with a geometric structural design adapted to at least a partial area of the geometric structural design of the object to be unpacked and/or several suction and/or blower tool body segments for forming a suction and/or blower tool body with a geometric structural design adapted to at least a partial area of the geometric structural design of the object to be unpacked and uses it/them to unpack the object to be unpacked. A respectively provided control device has a positive effect on the automatability of the unpacking processes that can be or are performed with the unpacking device.

The control device can furthermore be provided for generating respective control information on the basis of data describing the geometric structural design of a respective object to be unpacked, especially on the basis of construction data describing the geometric structural design of a respective object to be unpacked. The movements of the robot axes can therefore be adapted to the geometric structural design or geometric structural characteristics, i.e., especially the outer and/or inner contour, any undercuts, etc., of the object to be unpacked. Unpacking processes can be controlled individually by taking into account the geometric structural design of a respective object to be unpacked. Thus, the efficiency of the unpacking processes that can be or are performed with the unpacking device can be increased (considerably).

In addition to the unpacking device, the invention also relates to an unpacking station for a system for additive manufacturing of three-dimensional objects. The unpacking station is characterized in that it comprises at least one unpacking device as described. Hence, all explanations in connection with the unpacking device apply analogously to the unpacking station.

The unpacking station can comprise an, especially box-shaped, unpacking chamber, which can form a part of a housing structure associated with the unpacking station. Typically, the unpacking station can be rendered or is inert. The robot(s) associated with the unpacking device, if any, can be arranged or formed on or in a bottom, side, or top wall of the unpacking chamber (co)limiting the unpacking chamber. Basically, both standing and (laterally) hanging arrangements of robots are conceivable.

The unpacking device or the robot(s) associated with the unpacking device, if any, can be arranged or formed in a fixed position or movably supported in at least one freedom degree of motion in the unpacking chamber. If the robot(s) does/do not have own movement drives, suitable movement devices can be provided on the unpacking chamber side, which allow guided movement of the unpacking device or a robot, especially along a certain movement path. Respective movement devices can, e.g., contain guided movement of the unpacking device or a robot along an object to be unpacked inside a construction module containing an object to be unpacked, moved to the unpacking station. Here, the robot can be moved to (pre)defined unpacking positions. The unpacking positions, in turn, can be selected on the basis of the geometric structural design of the object to be unpacked.

In addition to the unpacking device and unpacking station, the invention also relates to a system for additive manufacturing of three-dimensional objects. The system is characterized in that it comprises at least one unpacking station as described. Hence, all explanations in connection with the unpacking device and in connection with the unpacking station apply analogously to the system.

In addition to the unpacking station, the system typically comprises at least one apparatus for additive manufacturing of three-dimensional objects, i.e., for example, technical components or technical component groups, by successive, selective layer-by-layer exposure and thus solidification of construction material layers of construction material that can be solidified by means of a laser beam. The selective solidification of respective construction material layers to be solidified selectively is performed based on object-related construction data. Respective construction data describe the geometric structural design of the respective object to be manufactured additively and can contain, for example, "sliced" CAD data of the respective object to be manufactured additively. The apparatus can be formed as an SLM apparatus, i.e., as an apparatus for performing selective laser melting methods (SLM methods), or as an SLS apparatus, i.e., as an apparatus for performing selective laser sintering methods (SLS methods).

The invention is explained in more detail by means of exemplary embodiments in the drawings. In which:

FIG. 1 shows a schematic diagram of an unpacking station 1 according to an exemplary embodiment.

Figure 1:
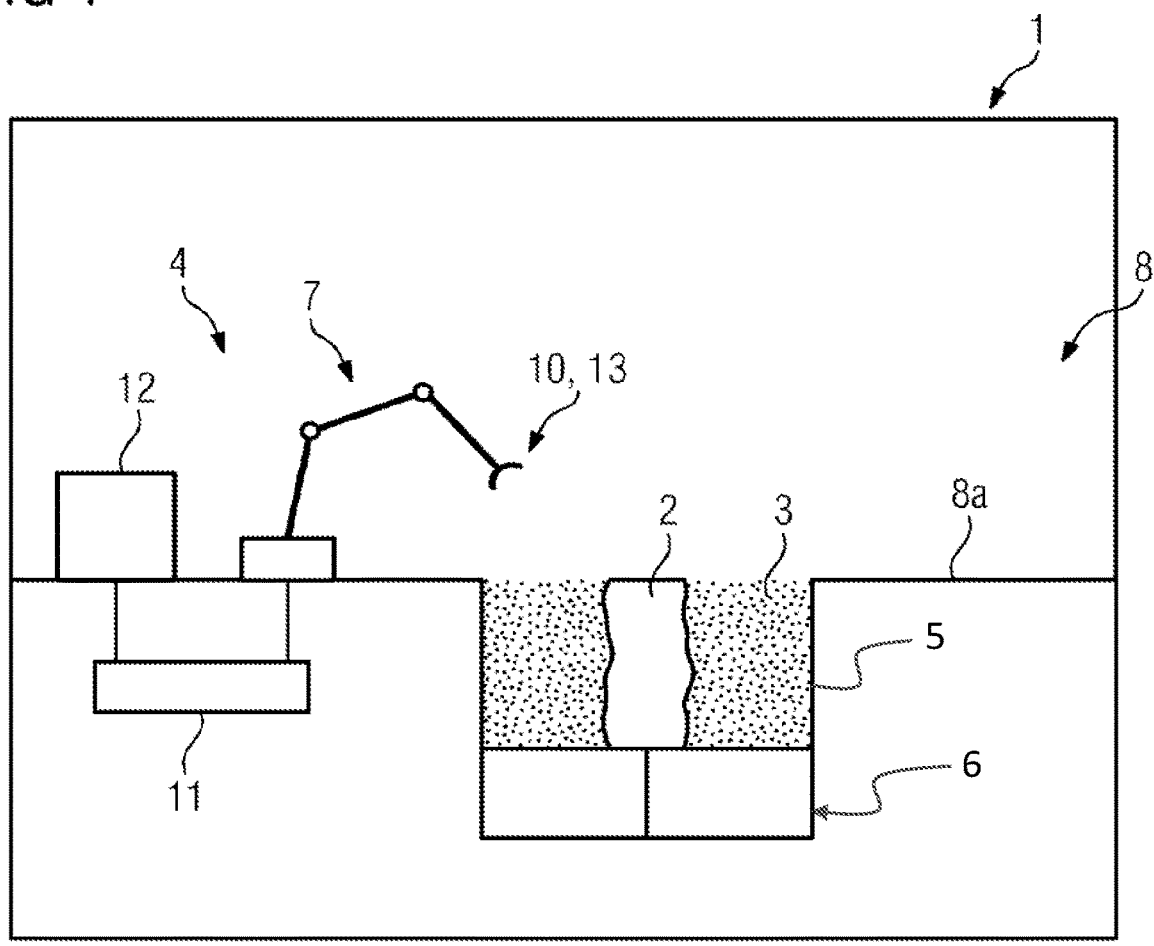
FIG. 1 shows a schematic diagram of an unpacking station according to an exemplary embodiment.

The unpacking station 1 is assigned to an apparatus (not shown) for additive manufacturing of three-dimensional objects 2, i.e., especially technical components or technical component groups. The apparatus is provided for additive manufacturing of three-dimensional objects 2 by successive, selective layer-by-layer exposure and thus solidification of construction material layers of construction material 3 that can be solidified, i.e., for example, metal powder, by means of a laser beam. The selective solidification of respective construction material layers to be solidified selectively is performed based on object-related construction data. Respective construction data describe the geometric structural design of a respective object 2 to be manufactured additively.

The apparatus as well as the unpacking station 1 assigned to it form component parts of a superordinate system (not shown) for additive manufacturing of three-dimensional objects 2.

The unpacking station 1 comprises an unpacking device 4. The unpacking device 4 is arranged in an unpacking chamber 8 of the unpacking station 1, which can be or is rendered inert with inert gas such as argon, nitrogen, etc. The unpacking chamber 8 can form a part of a housing structure (not denoted in more detail) associated with the unpacking station 1.

The unpacking device 4 is provided for unpacking an additively manufactured three-dimensional object 2 from the unsolidified powdery construction material 3 surrounding it after completion of an additive construction process. In the exemplary embodiment shown in FIG. 1, the object 2 and the construction material 3 surrounding it are arranged in a construction room 5 or construction chamber of a construction module 6 moved to the unpacking station 1.

The unpacking device 4 comprises a suction and/or blower device 12. The suction and/or blower device 12 is provided for generating a suction and/or blower flow for unpacking a respective object 2. The unpacking device 4 is therefore provided for unpacking the object 2 by sucking off (suction flow) and/or blowing off (blower flow) construction material. The suction and/or blower flow used can be inert; the suction and/or blower flow can be, e.g., an argon or nitrogen flow.

The suction and/or blower device 12 comprises a suction and/or blower tool 10. The suction and/or blower tool 10 comprises a suction and/or blower tool body 13. In the suction and/or blower tool body 13, at least one, especially nozzle-like or -shaped, suction and/or blower opening 14 for a suction and/or blower flow is formed. The suction and/or blower tool 10 is connected to a part of the suction and/or blower device 12 generating a suction or blower flow via a pipe element 15 that can be flown through by a suction or blower flow. The suction and/or blower tool body 13 can (additionally) have a brush fitting (not shown) comprising several, especially textile, brush elements arranged or formed bristle-like.

As can be seen especially from the exemplary embodiments of respective suction and/or blower tool bodies 13 shown in FIG. 3-8, the geometric structural design, i.e., especially the dimensions and/or shape or basic shape, of the suction and/or blower tool body 13 can be or is adapted to at least a partial area of the geometric structural design of the respective object 2 to be unpacked or to the entire geometric structural design of the respective object 2 to be unpacked. The spatial physical outer shape of the suction and/or blower tool body 13 therefore corresponds at least sectionally to the complete spatial physical outer shape of the respective object 2 to be unpacked. The geometric structural design of the suction and/or blower tool body can be selected on the basis of data describing the geometric structural design of the respective object 2 to be unpacked, especially on the basis of construction data describing the geometric structural design of the respective object 2 to be unpacked.

Figure 3:
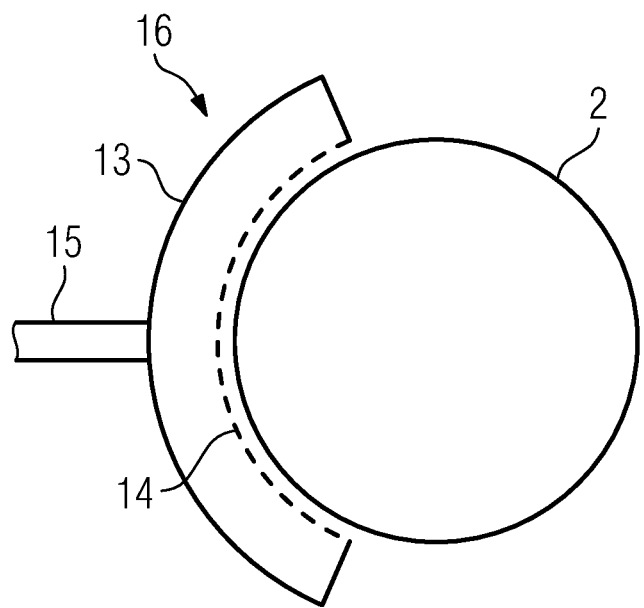
FIG. 3-8 each show a schematic diagram of a suction and/or blower tool according to an exemplary embodiment.

If an object 2 to be unpacked—like, e.g., a cylinder or hollow cylinder—has, for example, a round or roundish geometric structural design, the geometric structural design of the suction and/or blower tool body 13 is round or roundish as well (cf. FIG. 3, 5). In this case, a suction and/or blower tool body 13 with a geometric structural design adapted to the round or roundish geometry of the object 2 to be unpacked can be or is therefore used. If an object 2 to be unpacked—like, e.g., a polyhedron—has a geometric structural design with several plane surfaces, the geometric structural design of the suction and/or blower tool body 13 is plane as well. In this case, a suction and/or blower tool body 13 with a plane geometric structural design corresponding to the geometric structural design of the object 2 to be unpacked having several plane surfaces can be or is therefore used.

In the exemplary embodiment of a suction and/or blower tool body 13 shown in a top view in FIG. 3, the suction and/or blower tool body 13 is formed running in a curve or bend corresponding to the curvature of the outer contour of the object 2. The suction and/or blower tool body 13 encompasses (in circumferential direction) at least a part of the outer contour of the object 2.

Figure 4:
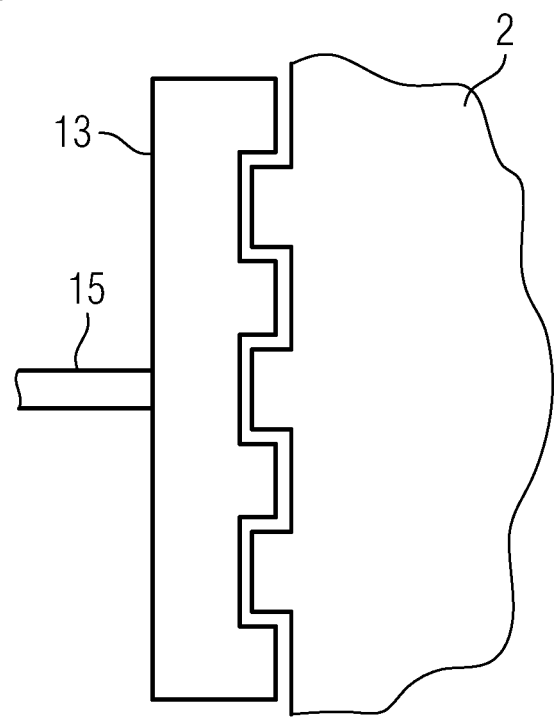

In the exemplary embodiment of a suction and/or blower tool body 13 shown in a top view in FIG. 4, the suction and/or blower tool body 13 is formed running progressively corresponding to the, especially prong-like or merlon-like or -shaped, stepped outer contour of the object 2. The suction and/or blower tool body 13 encompasses (in circumferential direction) at least a part of the outer contour of the object 2.

Figure 5:
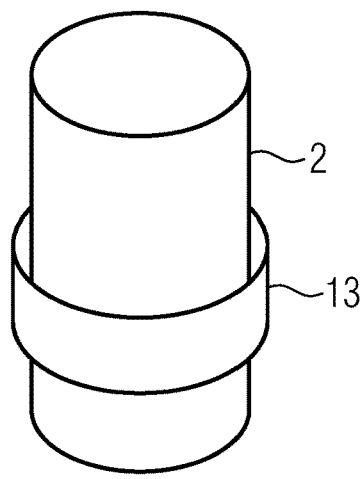

In the exemplary embodiment of a suction and/or blower tool body 13 shown in a perspective in FIG. 5, the suction and/or blower tool body 13 is formed running in the form of a ring corresponding to the roundness of the outer contour of the (hollow) cylindrical object 2. The suction and/or blower tool body 13 completely encompasses (in circumferential direction) the outer contour of the object 2.

Figure 6:
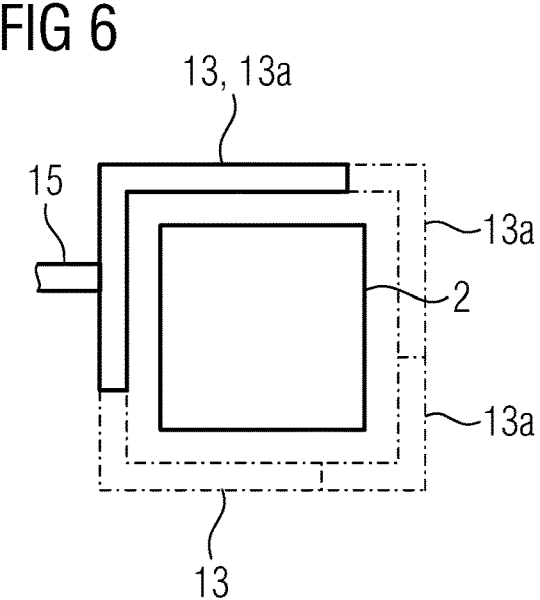

In the exemplary embodiment of a suction and/or blower tool body 13 shown in a top view in FIG. 6, the suction and/or blower tool body 13 is formed running in the form of a square corresponding to the quadrangular outer contour of the object 2. The suction and/or blower tool body 13 completely encompasses (in circumferential direction) the outer contour of the object 2 to be unpacked. The suction and/or blower tool body 13 is here formed by several suction and/or blower tool body segments 13a attached to each other, each having an L shape by way of example. To illustrate that the blower tool body 13 can also comprise only one (single) blower tool body segment 13a, optional blower tool body segments 13a are shown dashed.

Figure 7:
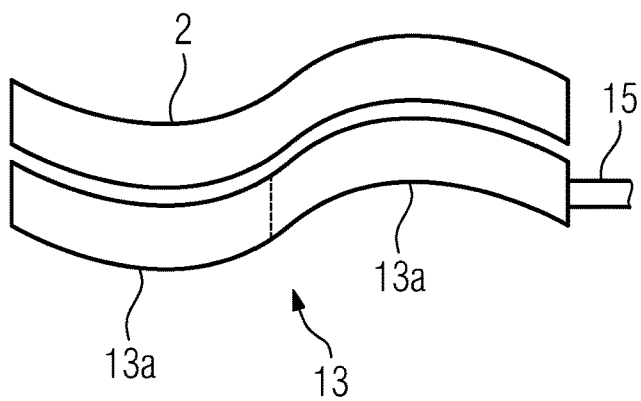

In the exemplary embodiment of a suction and/or blower tool body 13 shown in a top view in FIG. 7, the suction and/or blower tool body 13 is formed running in waves corresponding to the waved outer contour of the object 2. The suction and/or blower tool body 13 encompasses a part of the outer contour of the object 2 to be unpacked (in longitudinal direction). The suction and/or blower tool body 13 is here formed by several suction and/or blower tool body segments 13a attached to each other, each running in a curve, by way of example.

From the exemplary embodiments shown in FIG. 6, 7 it can be seen that the suction and/or blower tool body 13 can comprise several suction and/or blower tool body segments 13a, which can be or are attached to each other detachably by forming the suction and/or blower tool body 13. Depending on the geometric structural design of the suction and/or blower tool body segments 13a forming the suction and/or blower tool body 13, an—in terms of the geometric structure—individually adaptable or adapted configuration of the suction and/or blower tool body 13 is possible. Respective suction and/or blower tool body segments 13a can have an identical or a different geometric structural design.

Respective suction and/or blower tool body segments 13a are provided with suitable mounting interfaces (not shown), which ensure a stable, nevertheless detachable attachment of these to each other. Respective mounting interfaces can allow, e.g., form-locked and/or force-locked fastening of respective suction and/or blower tool body segments 13a to each other. By way of example, reference is made to clip, clamp, latch, and screw fastenings.

The suction and/or blower tool body segments 13a are provided with at least one flow channel section (not shown). When respective suction and/or blower tool body segments 13a are attached to each other, the flow channel sections form a flow channel (not shown) that at least sectionally penetrates the suction and/or blower tool body 13. The flow channel communicates with respective suction and/or blower openings 14 of the suction and/or blower tool body 13 on the one hand and with a respective pipe element 15 on the other hand, via which the suction and/or blower tool 13 is connected with the part of the suction and/or blower device 12 generating a suction or blower flow.

From the exemplary embodiments shown in FIG. 3-7 it can be seen that a constant distance between the suction and/or blower tool body 13, i.e., especially the suction and/or blower tool body section facing the object 2, which typically provides respective suction and/or blower openings 14, and the object 2 can be possible. Although shown explicitly in FIG. 3 only, respective suction and/or blower openings 14 are, of course, provided in all exemplary embodiments.

Figure 8:
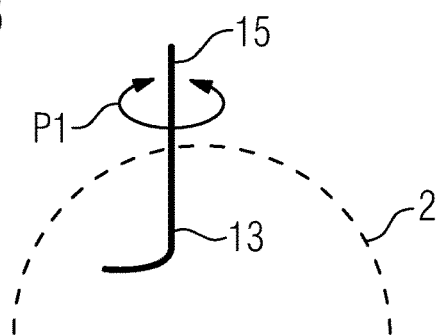

In the exemplary embodiment shown in a sectional view in FIG. 8, the object 2 has a dome-shaped geometric structural design with several openings. The object 2 can be, e.g., a foam body having a foam structure. Specifically, the object 2 can be, e.g., an artificial acetabulum or a part thereof. The suction and/or blower tool body 13 has a cannula-like or -shaped elongated geometric structural design with a curved free end. The suction and/or blower tool body 13 can be led through the openings available in the object 2 into an interior of the object 2; the cross-section geometry of the suction and/or blower tool body (section) is adapted to the cross-section geometry of the opening. The double arrow P1 indicates that the suction and/or blower tool body 13 can possibly be rotated around a rotation axis.

From the explanations in connection with the exemplary embodiments shown in FIG. 3-8 it results that the unpacking device 4 allows for leading the suction and/or blower tool body 13 closer to an object 2 to be unpacked and/or—in the case of several objects 2 to be unpacked—closer between objects 2 to be unpacked that are arranged adjacently. The suction and/or blower tool body 13 can be led to the object 2 or, possibly through openings available in the object 2, into possibly existing interiors of the object 2.

The unpacking device 4 can comprise a storage device (not shown). Several suction and/or blower tool bodies 13 of a given geometric structural design and/or several suction and/or blower tool body segments 13a of a given geometric structural design can be or are arranged in the storage device. The suction and/or blower tool bodies (segments) 13, 13a can be arrangeable or arranged according to geometric structural criteria, especially according to the geometric dimension and/or geometric basic shape, in the storage device. The storage device can comprise several storage compartments, which are provided for storing suction and/or blower tool bodies (segments) 13, 13a of a certain geometric structural design, i.e., adapted correspondingly in their dimensions, so that the storage device has a structure that is all in all as compact as possible.

From FIG. 1 it can be seen that the unpacking device 4 can comprise a robot 7 having at least three (different) robot axes A1-A6. The robot 7 is arranged, e.g., on a bottom wall 8a of the unpacking chamber 8 limiting the unpacking chamber 8 at the bottom. However, it is also conceivable that the robot 7 is arranged or formed on a side wall or top wall of the unpacking chamber 8 (co)limiting the unpacking chamber 8. Basically, both standing and (laterally) hanging arrangements of robots 7 are conceivable.

The robot 7 can be arranged in a fixed position or movably supported in at least one freedom degree of motion in the unpacking chamber 8. If the robot 7 does not have its own movement drives, suitable movement devices (not shown) can be provided on the unpacking chamber side, which allow guided movement of the robot 7, especially along a certain movement path. Respective movement devices can contain, e.g., guided movement of the robot 7 along the object 2 to be unpacked or inside the construction module 6 containing the object 2 to be unpacked, moved to the unpacking station 1. Here, the robot 7 can be moved to (pre)defined unpacking positions, which can be selected on the basis of the geometric structural design of the object 2 to be unpacked.

Figure 2:
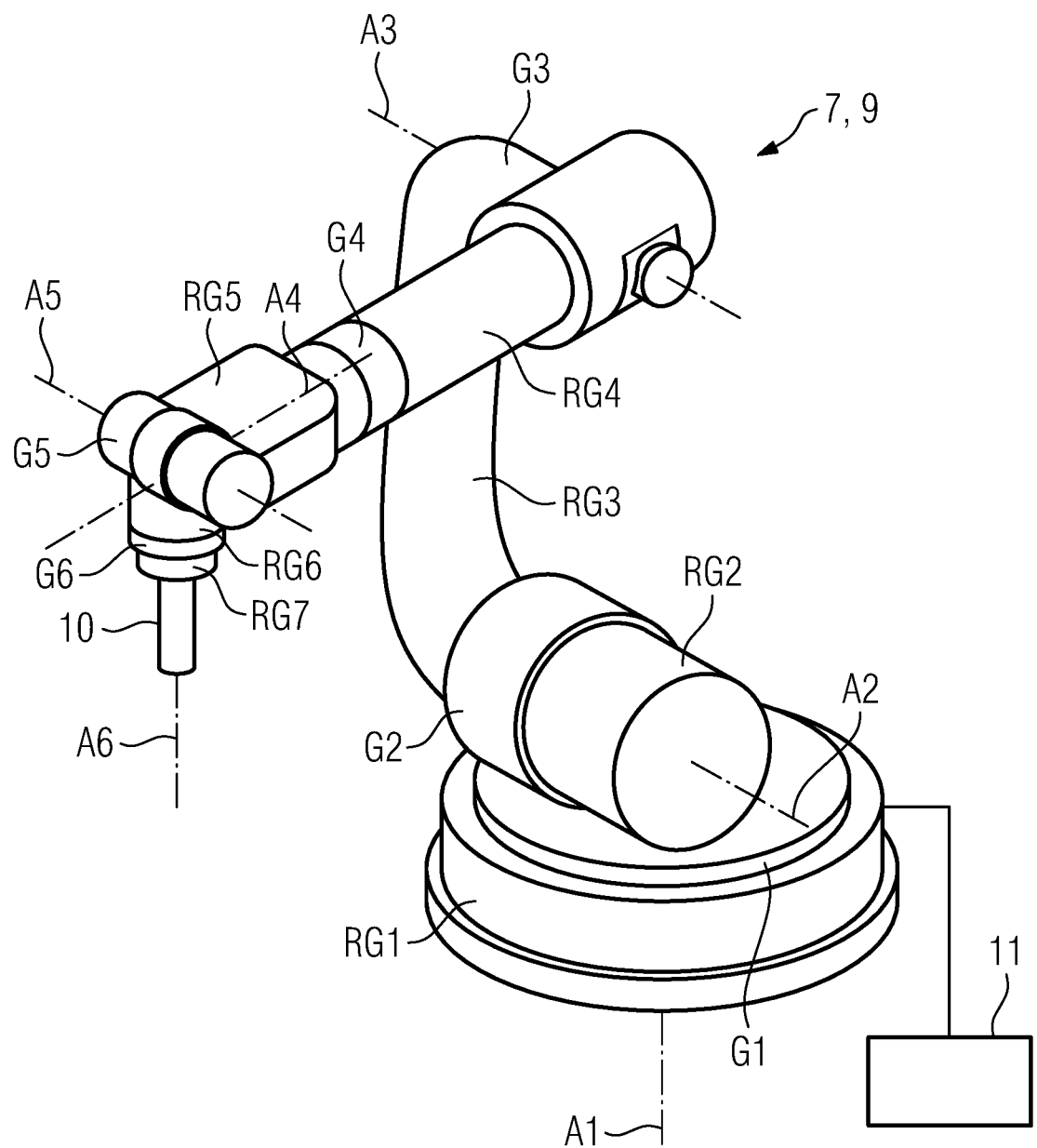
FIG. 2 shows a schematic diagram of a robot according to an exemplary embodiment.

FIG. 2 shows a schematic diagram of a robot 7 according to an exemplary embodiment, which robot 7 can be used in the unpacking station 1 shown in FIG. 1.

The robot 7 is designed as a jointed arm or articulated arm robot and comprises a robot arm 9. The robot arm 9 comprises several robot elements RG 1-RG7 arranged in series connection, flexibly connected with each other via joint elements G1-G6. The joint elements G1-G6 are swivel joints. The joint elements G1-G6 establish a swivel connection of robot elements RG 1-RG7 each arranged (directly) adjacently. Apparently, the robot axes A1-A1 are assigned to the joint elements G1-G6 or robot elements RG1-RG7 connected with each other via the joint elements G1-G6.

The respective robot axes A1-A6 or joint elements G1-G6 or robot elements RG1-RG7 can be controlled independently and accordingly be moved independently. Control of the movements of the robot elements RG1-RG7, i.e., control of the operation of the robot 7, is performed via a control device 11 implemented by hardware and/or software.

In the exemplary embodiment shown in FIG. 2, the robot elements RG1-RG7 are a base (robot element RG1), a carousel (robot element RG2) connected downstream of that, pivoting around the robot axis A1, a swinging link (robot element RG3) connected downstream of that, pivoting around the robot axis A2, a cantilever (robot element RG4) connected downstream of that, pivoting around the robot axis A3, a multiaxial robot hand (robot element RG5) connected downstream of that, pivoting around the robot axis A4, a fastening device (robot element RG6) connected downstream of that, pivoting around the robot axis A5, and a tool holding device (robot element RG7) connected downstream of that, pivoting around the robot axis A6. Instead of the tool holding device, a robot tool could be arranged as well.

On the (last) joint G6 or the (last) robot element RG7 forming the free end of the robot arm 9, the suction and/or blower tool 10 or the suction and/or blower tool body 13 is arranged.

The suction and/or blower tool 10 or the suction and/or blower tool body 13 can be arranged or attached detachably on/to the robot axis A6 or robot element RG7. To realize a detachable attachment, suitable, especially mechanic, mounting interfaces (not shown) can be arranged or formed on the robot 7 and/or on the suction and/or blower tool 10 or suction and/or blower tool body 13, which allow detachable attachment of the suction and/or blower tool 10 or suction and/or blower tool body 13 to the robot axis A6 or robot element RG7. Detachable attachment of the suction and/or blower tool 10 or suction and/or blower tool body 13 to the robot axis A6 or robot element RG7 can also be realized by the robot axis A6 or robot element RG7 comprising a gripping element, which is provided for gripping the suction and/or blower tool 10 or suction and/or blower tool body 13.

The detachable arrangement or attachment of the suction and/or blower tool 10 or suction and/or blower tool body 13 on/to the robot axis A6 or robot element RG7 allows that a suction and/or blower tool 10 or suction and/or blower tool body 13 is arranged or attached exchangeably as necessary on/to the robot axis A6 or robot element RG7. The robot 7 can be set, e.g., in a tool change mode or program specifically designed for that, to perform an automated change of a suction and/or blower tool 10 or suction and/or blower tool body 13. Here, the robot 7, i.e., especially the robot axis A6 or robot element RG7, can be moved to an exchange position in which the robot 7 autonomously performs a tool change. In the exchange position, the robot 7, i.e., at least the robot axis A6 or robot element RG7 to which the suction and/or blower tool 10 or suction and/or blower tool body 13 is to be or is attached detachably, can give suction and/or blower tools 10 or suction and/or blower tool bodies 13 to a storage device assigned to the unpacking device 4 or take such from a storage device assigned to the unpacking device 4.

As mentioned, the unpacking device 4 comprises a control device 1 implemented by hardware and/or software. The control device is provided especially for generating control information controlling the movements of the robot axes A1-A6 during operation of the robot 7. Regardless of the availability of a robot 7, the control device 11 can be provided for controlling the robot 7, especially by taking into account the geometric structural design of an object 2 to be unpacked, so that it selects a suction and/or blower tool body 13 with a geometric structural design adapted to at least a partial area of the geometric structural design of the object 2 to be unpacked and/or several suction and/or blower tool body segments 13a for forming a suction and/or blower tool body 13 with a geometric structural design adapted to at least a partial area of the geometric structural design of the object 2 to be unpacked and uses it/them for unpacking the object 2 to be unpacked.

The control device 11 can furthermore be provided for generating respective control information on the basis of data describing the geometric structural design of the respective object 2 to be unpacked, especially on the basis of construction data describing the geometric structural design of the respective object 2 to be unpacked. The movements of the robot axes A1-A6 can therefore be adapted to the geometric structural design or geometric structural characteristics, i.e., especially the outer and/or inner contour, any undercuts, etc., of the object 2 to be unpacked. Unpacking processes can be controlled individually by taking into account the geometric structural design of the respective object 2 to be unpacked.

It applies to all exemplary embodiments that the suction and/or blower tool body 13 or a respective suction or blower tool body segment 13a can be an additively manufactured object.

The invention claimed is:

1. An unpacking device for unpacking an additively manufactured three-dimensional object from unsolidified construction material, the unpacking device comprising:
   a robot comprising at least three robot axes, wherein the robot comprises a suction and/or blower device comprising at least one suction and/or blower tool on at least one of the robot axes, wherein the at least one suction and/or blower tool is configured to receive at least one suction and/or blower tool body conforming to at least a partial area of a geometric structural design of the additively manufactured three-dimensional object, and wherein the suction and/or blower tool body is detachably attachable to the suction and/or blower tool;
   a control device configured to generate control commands to control the robot, wherein the control commands comprise:
      selecting the at least one suction and/or blower tool body from a plurality of suction and/or blower tool bodies based at least in part on at least the partial area of the geometric structural design of the additively manufactured three-dimensional object to be unpacked, wherein the at least one selected suction and/or blower tool body comprises a geometric structural design conforming to at least the partial area of the geometric structural design of the additively manufactured three-dimensional object to be unpacked; and
      using the at least one selected suction and/or blower tool body to unpack at least a portion of the additively manufactured three-dimensional object to be unpacked.

2. The unpacking device of claim 1, wherein the at least one suction and/or blower tool body comprises a two-dimensional shape.

3. The unpacking device of claim 1, wherein the at least one suction and/or blower tool body comprises a three-dimensional shape.

4. The unpacking device of claim 1, wherein selecting the suction and/or blower tool body is based at least in part on data describing the geometric structural design of at least one additively manufactured three-dimensional object to be unpacked.

5. The unpacking device of claim 1, wherein the at least one suction and/or blower tool body comprises a plurality suction and/or blower tool body segments detachably attachable to one another.

6. The unpacking device of claim 5, wherein at least two suction and/or blower tool body segments comprise identical geometric structural designs.

7. The unpacking device of claim 5, wherein at least two suction and/or blower tool body segments comprise different geometric structural designs.

8. The unpacking device of claim 1, wherein at least one of the plurality of suction and/or blower tool bodies are stored in a storage device when not detachably attached to the suction and/or blower tool.

9. The unpacking device of claim 8, wherein the plurality of suction and/or blower tool bodies stored in the storage device comprise a plurality.

10. The unpacking device of claim 1, wherein the at least one suction and/or blower tool body comprises an additively manufactured component.

11. An unpacking station for unpacking an additively manufactured three-dimensional object from unsolidified construction material, the unpacking station comprising:
  an unpacking chamber;
  an unpacking device disposed within the unpacking chamber, the unpacking device comprising a robot comprising at least three robot axes, wherein the robot comprises a suction and/or blower device comprising at least one suction and/or blower tool on at least one of the robot axes, wherein the at least one suction and/or blower tool is configured to receive at least one suction and/or blower tool body conforming to at least a partial area of a geometric structural design of the additively manufactured three-dimensional object, and wherein the suction and/or blower tool body is detachably attachable to the at least one suction and/or blower tool; and,
  a control device configured to generate control commands to control the robot, wherein the control commands comprise:
    selecting the at least one suction and/or blower tool body from a plurality of suction and/or blower tool bodies based at least in part on at least the partial area of the geometric structural design of the additively manufactured three-dimensional object to be unpacked, wherein the at least one selected suction and/or blower tool body comprises a geometric structural design conforming to at least the partial area of the geometric structural design of the additively manufactured three-dimensional object to be unpacked; and
    using the at least one selected suction and/or blower tool body to unpack at least a portion of the additively manufactured three-dimensional object to be unpacked.

12. The unpacking station of claim 11, wherein the unpacking device is disposed in a fixed position in the unpacking chamber.

13. The unpacking station of claim 11, wherein the unpacking device is movably supported in at least one freedom degree of motion in the unpacking chamber.

14. The unpacking station of claim 11, further comprising a storage device, wherein at least one of the plurality of suction and/or blower tool bodies are stored in a storage device when not detachably attached to the suction and/or blower tool.

15. The unpacking station of claim 14, wherein the storage device is disposed within the unpacking device.

16. The unpacking station of claim 11, wherein the at least one suction and/or blower tool body comprises a two-dimensional shape.

17. The unpacking station of claim 11, wherein the at least one suction and/or blower tool body comprises a three-dimensional shape.

18. The unpacking station of claim 11, wherein selecting the at least one suction and/or blower tool body is based at least in part on data describing the geometric structural design of at least one additively manufactured three-dimensional object to be unpacked.

19. The unpacking station of claim 11, wherein the at least one suction and/or blower tool body comprises a plurality suction and/or blower tool body segments detachably attachable to one another.

20. The unpacking station of claim 19, wherein of the plurality of suction and/or blower tool body segments comprise different geometric structural designs.

* * * * *